March 26, 1968  D. J. MARLEY  3,375,046
FOIL THRUST BEARING ARRANGEMENTS
Filed Nov. 1, 1965
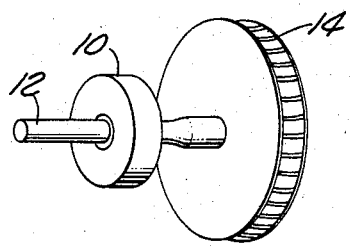
FIG. 1.
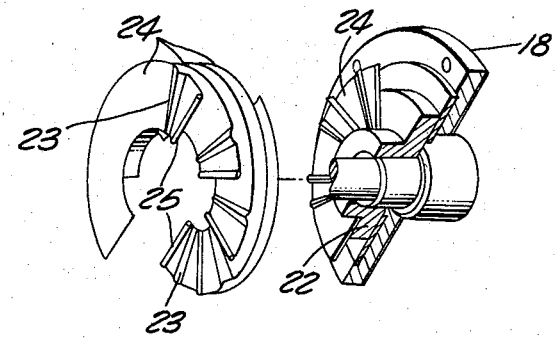
FIG. 2.
FIG. 3.
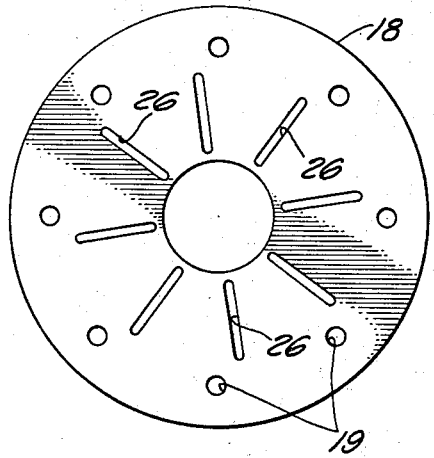
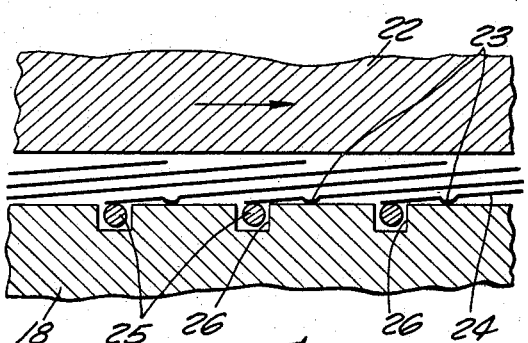
FIG. 4.
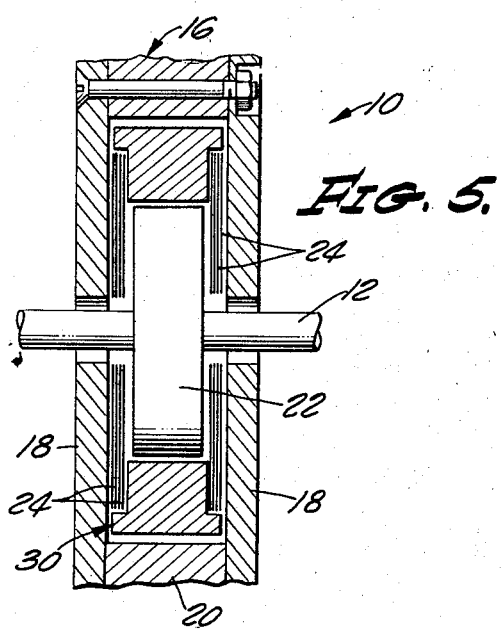
FIG. 5.
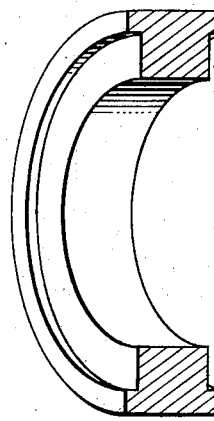
FIG. 6.
INVENTOR.
DAVID JOHN MARLEY
BY Fraser and Bogucki
ATTORNEYS

United States Patent Office 3,375,046
Patented Mar. 26, 1968

3,375,046
FOIL THRUST BEARING ARRANGEMENTS
David John Marley, Buena Park, Calif., assignor to The Garrett Corporation, Los Angeles, Calif., a corporation of California
Filed Nov. 1, 1965, Ser. No. 505,808
11 Claims. (Cl. 308—164)

ABSTRACT OF THE DISCLOSURE

Foil thrust bearing arrangements are provided wherein a plurality of foils are held in fixed position by a thrust plate to provide bearing surfaces with an engaging shaft mounted thrust disk. The foils, which have a leading edge radially mounted on the thrust plate, extend about the shaft and overlap one another in shingle fashion, a convoluted portion in one or more foils increasing bearing resiliency. A bi-directional thrust bearing arrangement includes separate foil groups and associated thrust plates on opposite sides of the thrust disk, and retainer means between the opposite groups of foils minimizing foil contact with the disk.

---

This invention relates to gas-lubricated thrust bearings for rotating machinery, and more particularly to thrust bearings of this type utilizing foils as bearing surfaces.

Gas bearings, both hydrodynamic and hydrostatic, have been the subject of considerable investigation in recent years because of their capability for supporting rotating equipment operating at very high speeds approaching a million revolutions per minute or more. However, thrust bearings of the gas-lubricated type have been particularly difficult to develop because of the extremely close tolerances which must be observed in manufacture and maintained in practice. Alignment of the bearing components is also extremely difficult to achieve satisfactorily. An example of the tolerances imposed on such devices is the requirement that the bearing surfaces be flat to 3 helium light bands and that the bore be square to 50 millionths of an inch. Even where such tolerances can be realized, the thrust bearings are still subject to problems of intertial and thermal distortion which often causes failure at high speed of structures manufactured within tolerances.

It is therefore a general object of the present invention to provide an improved thrust bearing of the gas-lubricated type.

It is also an object of the present invention to provide an improved, gas-lubricated thrust bearing which is not subject to the extremely close manufacturing tolerances mentioned hereinabove.

It is a further object of this invention to overcome the problems heretofore reuslting from inertial and thermal distortion in high speed, gas-lubricated, thrust bearings structures.

Oftentimes the thrust bearings associated with high speed, rotating machinery are subjected to thrust loads in opposite directions under various operating conditions and so must, in effect, comprise a double bearing configuration providing bearings surfaces on opposite sides of a rotating thrust disk. Typically, the thrust load is zero at rest (zero r.p.m.) and it increases as the machine builds up rotational speed. Also the starting torque of the machine is relatively low so that static friction and starting drag should be kept as low as possible.

In accordance with the invention, a thrust bearing structure of the gas-lubricated type is provided in which foils are inserted in the bearing region to effectively eliminate the problems resulting from slight distortions in the bearing components and to relax the manufacturing tolerances heretofore imposed on such structures. As contrasted with the limits mentioned hereinabove, manufacturing tolerances are now typically specified to 0.0002 inch, a reduction of approximately two orders of magnitude or more. Foils used in this manner compensate effectively for the distortion above mentioned and may also compensate for slight variations in alignment of the bearing components. The foils which are so used are thin flexible sheets having a thickness relative to other dimensions such that the sheets may be locally deflected by hydrodynamic film forces between adjacent bearing surfaces and the foil. Foil journal bearings are described in "Some Instabilities and Operating Characteristics of High-Speed Gas-Lubricated Journal Bearings" by K. Fischer et al., ASME Paper 58A–231.

In using foils in thrust bearings which are designed to accept reverse thrust loads, it has been found that the foils impose an undesired pre-load which may interfere with the starting of the associated machine. That is, the foils bear against both sides of a bearing disk and exert a drag by "pinching" the disk so that the driving mechanism is sometimes unable to start the apparatus rotating, even though the thrust load from the apparatus is zero.

Accordingly, it is a specific object of the invention to provide a foil thrust bearing, gas-lubricated, which permits control of the pre-load thrust imposed on the bearing.

In brief, particular arrangements in accordance with the present invention may comprise a thrust plate affixed as part of the thrust bearing housing and configured to support a plurality of foils in a fixed position relative to a rotating thrust disk attached to a shaft. The foils are overlapped in the maner of building shingles and are configured to engage the adjacent thrust plate at appropriate points about its surface. In accordance with one particular aspect of the invention, the individual foils may be convoluted so as to provide the bearing with added resilence and depth, thus materially improving the operating characteristics of the bearing. The overlapping foils may be any reasonable length depending upon the number of plies to be employed, and typically an individual foil extends approximately 180° about the perimeter of the rotating shaft, although this angle is not critical, foils extending 90° and 120° respectively having been used. In apparatus where the bearing must support thrust loads in both directions along the axis of the shaft two sets of foils and thrust plates may be provided on opposite sides of the thrust disk which is attached to the shaft.

In accordance with a preferred aspect of the invention, a configuration is provided to control the bearing pre-load in a manner such that the set of foils on the side of the disk which is not supporting the thrust load are separated from the disk. In one particular embodiment of the invention, this is accomplished by utilizing a foil retainer encircling the thrust disk and extending between the two sets of foils on opposite sides of the disk which have an outside diameter greater than the outside diameter of the disk. The thickness of the foil retainer is slightly greater than the disk thickness so that the desired spacing between the foils is provided. By relating foil retainer thickness to disk thickness in varying degree, different amounts of pre-load can be achieved.

A better understanding of the present invention may be had from a consideration of the following detailed description, taken in conjunction with the accompanying drawing, in which:

FIG. 1 is a diagrammatic view of one particular arrangement in accordance with the invention;

FIG. 2 is a partially disassembled view of a portion of an arrangement which may be used in FIG. 1;

FIG. 3 is a plan view of a thrust plate employed in the bearing of FIGS. 1 and 2;

FIG. 4 is an enlarged developed view of a section of the arrangement of FIG. 2;

FIG. 5 is a cross-sectional view of an arrangement of FIG. 1, slightly different from that of FIG. 2, illustrating a particular component thereof; and FIG. 6 is a perspective view of a half-section of a particular element shown in the arrangement of FIG. 5.

FIG. 1 represents a typical bearing-shaft arrangement including a bearing 10 encompassing a shaft 12 which is shown coupled to a turbine wheel 14 for example only. The foil gas bearing 10 (see FIG. 5) has a housing 16 comprising a pair of thrust plates 18 separated with a circular spacer 20. As shown, the thrust plates 18 positioned on opposite sides of a thrust disk 22 affixed to the shaft 12 are individually associated with two sets of foils 24 which are adapted to support thrust loads applied along the axis of the shaft 12 in either direction. It will be understood that where the thrust load is uni-directional, the foils 24 on one side of the thrust disk 22 may be dispensed with. The foils 24 are shown in greater detail in FIG. 2, which is a partially disassembled view. It may be seen in the depicted example that each foil 24 extends approximately half way around the periphery of the shaft 12. The respective foils 24 overlap each other by substantially more than half of their available surface area. Each foil 24 is shown provided with a convoluted section 23 which provides additional depth and resilence to the bearing and improves its operating and load bearing characteristics. Each foil 24 is also provided with a bead or pin 25 along one edge which is adapted to fit in a corresponding slot 26 of the thrust plate 18 (see FIG. 3). The thrust plate 18 is also provided with holes 19 for assembly as a part of the bearing housing. The manner in which the pins 25 serve to hold the respective foils 24 in position may be seen more readily in FIG. 4, which is a developed view of a portion of the bearing shown in section in FIG. 2. The rotating thrust disk 22 is shown in FIG. 4 in relative motion from left to right and bearing against the foils 24 which are fixed in position by the pins 25 affixed to the ends of the foils 24 and recessed in appropriate slots 26 of the thrust plate 18. The effect of the convolutes 23 may also be seen in providing more depth and resilience in the foil bearing.

FIG. 6 illustrates a portion of the foil retainer 30, shown in section in FIG. 5, which may be included in accordance with one aspect of the invention for the purpose of controlling the pre-load of the bearing. The foil retainer 30 is slightly thicker in the axial dimension than is the adjacent thrust disk 22. It will also be noted that the foils 24 extend outwardly beyond the periphery of the thrust disk 22 into a region in which they bear against the foil retainer 30. By virtue of this arrangement, the foil retainer 30 provides additional separation of the two sets of foils 24 which results in that set which is not supporting a thrust load at the moment being separated from the adjacent disk. As a result, reduced operating friction is achieved because the disk 22 is not clamped between both sets of foils 24 but rather is permitted to bear against only one set of foils 24 at a time or may even be free of both sets of foils under conditions of zero thrust when the rotating member is stationary.

In one particular arrangement in accordance with the invention the foils 24 (FIGS. 2, 4 and 5) are not fabricated exclusively of metal but comprise sheets of metal and plastic (preferably Teflon) alternately interleaved in the thrust bearing configuration. The Teflon advantageously minimizes metal-to-metal contact in the bearing and also is the source of a thin film which builds up on the bearing surfaces for added lubrication where the bearing surfaces actually touch, as in transient overloads, for example.

By virtue of the above-described arrangements in accordance with the invention, an improved foil thrust bearing is provided which is less subject to critical manufacturing tolerances, and thus simpler and cheaper to manufacture, and is also less subject to failure from slight dimensional distortion, and thus freer from failure in operation than similar prior art bearings. Bearing pre-load is controlled in an effective and efficient manner and load bearing capability and operating characteristics are enhanced by the added resilience and depth of the bearing which results from the provision of the convoluted portion in each of the individual foils.

Although there have been described hereinabove particular arrangements of a foil thrust bearing in accordance with the invention for the purpose of illustrating the manner in which the invention may be used to advantage, it will be appreciated that the invention is not limited thereto. Accordingly, any and all modifications, variations or equivalent arrangements falling within the scope of the annexed claims should be considered to be a part of the invention.

What is claimed is:

1. A foil thrust bearing device comprising a thrust plate, a plurality of foils, each having an edge which is affixed to the thrust plate and radially disposed relative to a central axis extending through the thrust plate, a rotatable shaft, and a thrust disk attached to said shaft for rotation therewith in surface engaging relationship with said foils.

2. A device in accordance with claim 1 wherein said foils extend from approximately 90° to approximately 180° about the shaft and generally in planes normal to the axis of the shaft.

3. A device in accordance with claim 1 wherein said thrust plate is provided with a plurality of radial slots and the foils individually comprise a beaded portion adjacent a leading edge of the foil for engagement in a corresponding slot of the thrust plate.

4. A device in accordance with claim 1 wherein each foil includes a convoluted portion positioned to bear against an adjacent bearing surface to provide increased resilience for the bearing.

5. A foil thrust bearing device comprising a rotatable shaft, a thrust disk attached to said shaft for rotation therewith, a pair of thrust plates one on each side of said thrust disk, and a plurality of foils arranged in two groups on opposite sides of the thrust disk between the thrust disk and a corresponding thrust plate and capable of lateral movement relative to the thrust disk and the corresponding thrust plate.

6. A device in accordance with claim 5 further including means for supporting said thrust plates in spaced apart relation to form a housing for the thrust bearing device and wherein said foils are individually affixed to a corresponding thrust plate.

7. A device in accordance with claim 5 further including means for separating the foils from the thrust disk on the disk side which is not supporting a thrust load.

8. A device in accordance with claim 7 wherein said last-mentioned means comprises a foil retainer affixed to the bearing housing and positioned between the two groups of foils on opposite sides of the thrust disk.

9. A device in accordance with claim 8 wherein said foil retainer comprises a circular member extending about the thrust disk and being slightly thicker than said thrust disk, said foils being arranged to extend beyond the outside diameter of the thrust disk to bear against said foil retainer.

10. A foil thrust bearing device comprising a plurality of foils, a thrust plate arranged to hold said foils in a fixed position, a rotatable shaft, and a thrust disk attached to said shaft for rotation therewith in surface engaging relationship with said foils, said foils extending from approximately 90° to approximately 180° about the shaft and generally in planes normal to the axis of the shaft, and said foils overlapping each other so that each foil presents a portion of its surface which is less than half its available area for contact with said thrust disk.

11. A foil thrust bearing device including a plurality of foils comprising sheets of metal and plastic alternately interleaved with one another to minimize metal-to-metal contact, a thrust plate arranged to hold said foils in a fixed position, a rotatable shaft, and a thrust disk attached to said shaft for rotation therewith in surface engaging relationship with said foils.

References Cited

UNITED STATES PATENTS

| 1,165,594 | 12/1915 | Hani | 308—164 |
| 2,872,256 | 3/1959 | Thomson | 308—163 |
| 3,291,543 | 12/1966 | Nigh | 308—160 |
| 3,298,751 | 1/1967 | Elwell | 308—160 X |

MARTIN P. SCHWADRON, *Primary Examiner.*